(12) United States Patent
Groth et al.

(10) Patent No.: US 6,953,187 B2
(45) Date of Patent: Oct. 11, 2005

(54) ELASTOMER SPRING ESPECIALLY FOR RAIL VEHICLES

(75) Inventors: Michael Groth, Hamburg (DE); Andre Sanz, Hamburg (DE)

(73) Assignee: Phoenix AG, Hamburg (DE)

( * ) Notice: Subject to any disclaimer, the term of this patent is extended or adjusted under 35 U.S.C. 154(b) by 0 days.

(21) Appl. No.: 10/486,630

(22) PCT Filed: May 24, 2003

(86) PCT No.: PCT/DE03/01682

§ 371 (c)(1),
(2), (4) Date: Feb. 11, 2004

(87) PCT Pub. No.: WO03/106858

PCT Pub. Date: Dec. 24, 2003

(65) Prior Publication Data

US 2004/0173955 A1     Sep. 9, 2004

(30) Foreign Application Priority Data

Jun. 12, 2002 (DE) .............................. 102 26 166

(51) Int. Cl.⁷ .............................................. F16F 13/00

(52) U.S. Cl. ................ 267/141; 267/141.1; 267/141.3; 267/293; 267/294

(58) Field of Search ........................ 267/141.1–141.7, 267/141, 140.11, 146.13, 292, 153, 293, 294

(56) References Cited

U.S. PATENT DOCUMENTS

| | | | | |
|---|---|---|---|---|
| 2,126,707 A | * | 8/1938 | Schmidt | 267/140.5 |
| 2,762,600 A | * | 9/1956 | Mordarski et al. | 267/141.5 |
| 3,831,920 A | * | 8/1974 | Meldrum et al. | 267/137 |
| 4,401,298 A | * | 8/1983 | Eaton et al. | 267/140.13 |
| 4,560,150 A | | 12/1985 | Shtarkman | |
| 4,896,752 A | * | 1/1990 | Shtarkman | 188/266.1 |
| 4,936,556 A | * | 6/1990 | Makibayashi et al. | 267/140.13 |
| 5,156,380 A | * | 10/1992 | Cerruti et al. | 267/293 |
| 5,299,790 A | * | 4/1994 | Whightsil, Sr. | 267/292 |
| 6,663,090 B2 | * | 12/2003 | Simuttis et al. | 267/140.13 |

FOREIGN PATENT DOCUMENTS

| | | |
|---|---|---|
| DE | 861624 | 1/1953 |
| DE | 3402715 | 8/1985 |
| DE | 3610611 | 10/1987 |
| DE | 295 20 881 | 6/1996 |
| GB | 626747 | 7/1949 |

* cited by examiner

Primary Examiner—Matthew C. Graham
(74) Attorney, Agent, or Firm—Collard & Roe, P.C.

(57) ABSTRACT

An elastomer spring, particularly for rail vehicles, comprises a core made of metal or plastic; an outer sleeve that also consists of metal or plastic; a cushion made of elastomer material, in the form of a layered spring that is arranged between the core and the outer sleeve; as well as a base chamber that is configured below a core offset. The elastomer spring is configured in multiple steps in the vertical direction X, specifically consisting of at least a first spring and a second spring, whereby a chamber is present between two springs, in each instance.

11 Claims, 2 Drawing Sheets

ELASTOMER SPRING ESPECIALLY FOR RAIL VEHICLES

CROSS REFERENCE TO RELATED APPLICATIONS

Figure 1:
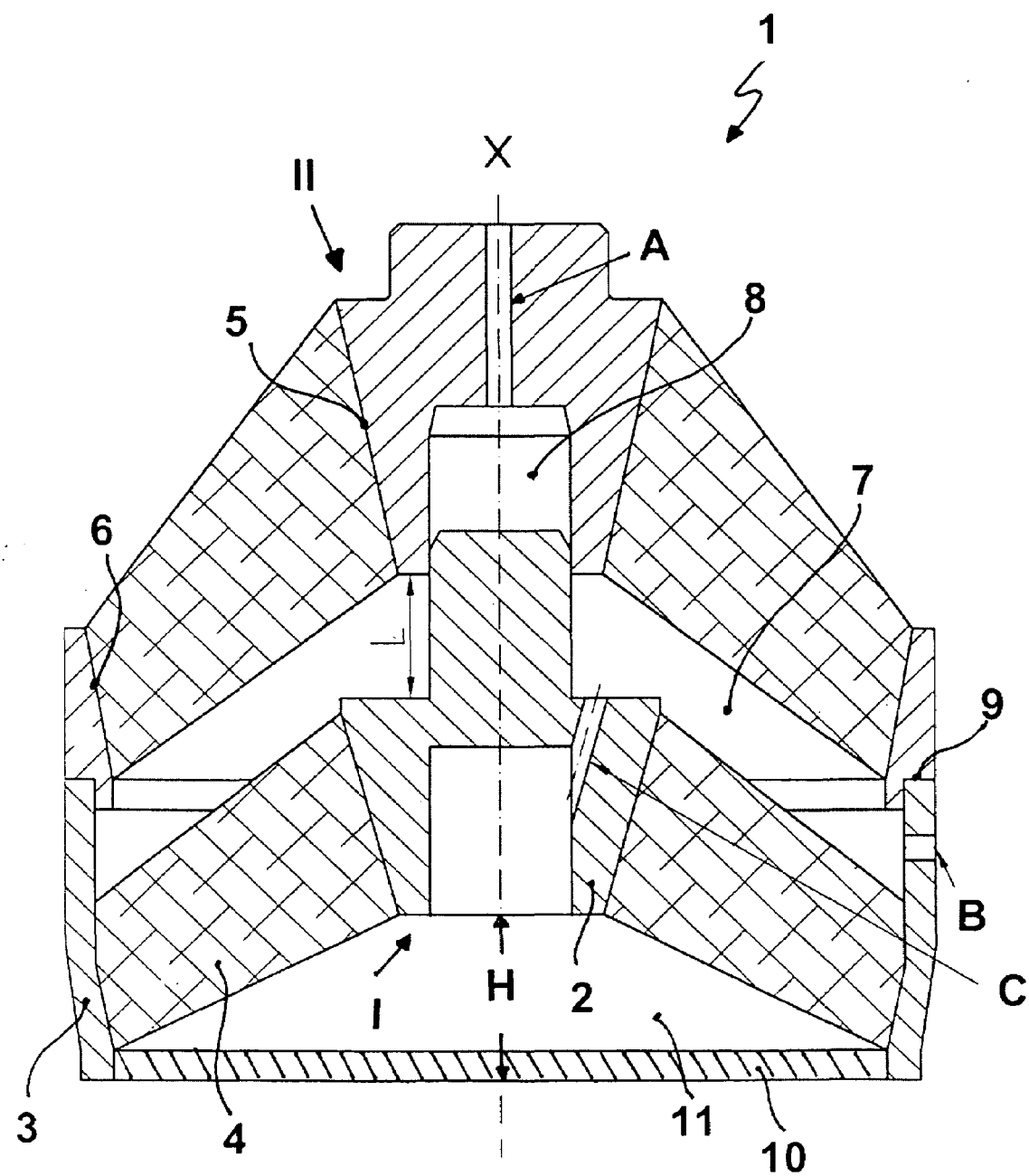

Applicants claim priority under 35 U.S.C. §119 of German Application No. 102 26 166.0 filed on Jun. 12, 2002. Applicants also claim priority under 35 U.S.C. §365 of PCT/DE03/01682 filed on May 24, 2003. The international application under PCT article 21(2) was not published in English.

The invention relates to an elastomer spring, particularly for rail vehicles, comprising at least:
- a core made of metal or plastic (e.g. on the basis of polyphenylene ether);
- an outer sleeve that also consists of metal or plastic;
- a cushion made of elastomer material, in the form of a layered spring (e.g. metal/elastomer laminate) that is arranged between the core and the outer sleeve; as well as
- a base chamber that is configured below a core offset.

An elastomer spring of this type, which is described, for example, in the document DE 295 20 881 U1, is preferably used in rail vehicle technology, and will now be explained in greater detail below.

A significant aspect is the guidance of the wheel set of a rail vehicle by means of elastic, play-free elastomer springs, in linear manner, in the three spatial directions, whereby the elastomer spring is attached between the frame of the rail vehicle and the axle bearing. In this connection, the lengthwise and crosswise axes of the vehicle lie in the radial direction of the guide element, while the vehicle axis runs in the axial direction of the latter.

The main requirement consists of optimization of the spring characteristic in the vertical direction, in order to guarantee protection against derailment when the vehicle is in the unloaded state, and to nevertheless fulfill the spring requirements when the vehicle is loaded. The desired ratio of the vertical stiffness in the unloaded state to that in the loaded state is generally approximately 0.2:1 to 0.8:1.

In the case of a conventional elastomer spring, the vertical spring characteristic generally runs in linear manner between the unloaded and the loaded state, in other words the stiffness ratio is 1:1 which, in the unloaded state can have the result that there is no guarantee that derailment will not occur. Therefore a compromise has to be made between the vertical stiffness of the two load states.

The task of the invention now consists of making available an elastomer spring that fulfills the entire complex of requirements indicated above.

This task is accomplished according to the characterizing part of claim 1, in that the elastomer spring is configured in multiple steps in the vertical direction, specifically consisting of at least a first spring and a second spring, whereby a chamber is present between two springs, in each instance.

Practical embodiments of the invention are named in claims 2 to 3.

By means of the configuration of the equalization bores, according to claim 5 or 6, and the use of throttles that can be controlled or regulated, according to claim 7, defined damping can additionally be achieved. It is furthermore possible to increase this damping in that the enclosed air volumes are replaced with a suitable damping fluid.

By means of the active application of compressed air or a pressurized fluid to the inside of the spring, it is possible to achieve active support of the elastomer spring. In this way, level regulation is additionally possible, as is the adaptation of the load-dependent vertical spring characteristic.

Figure 2:
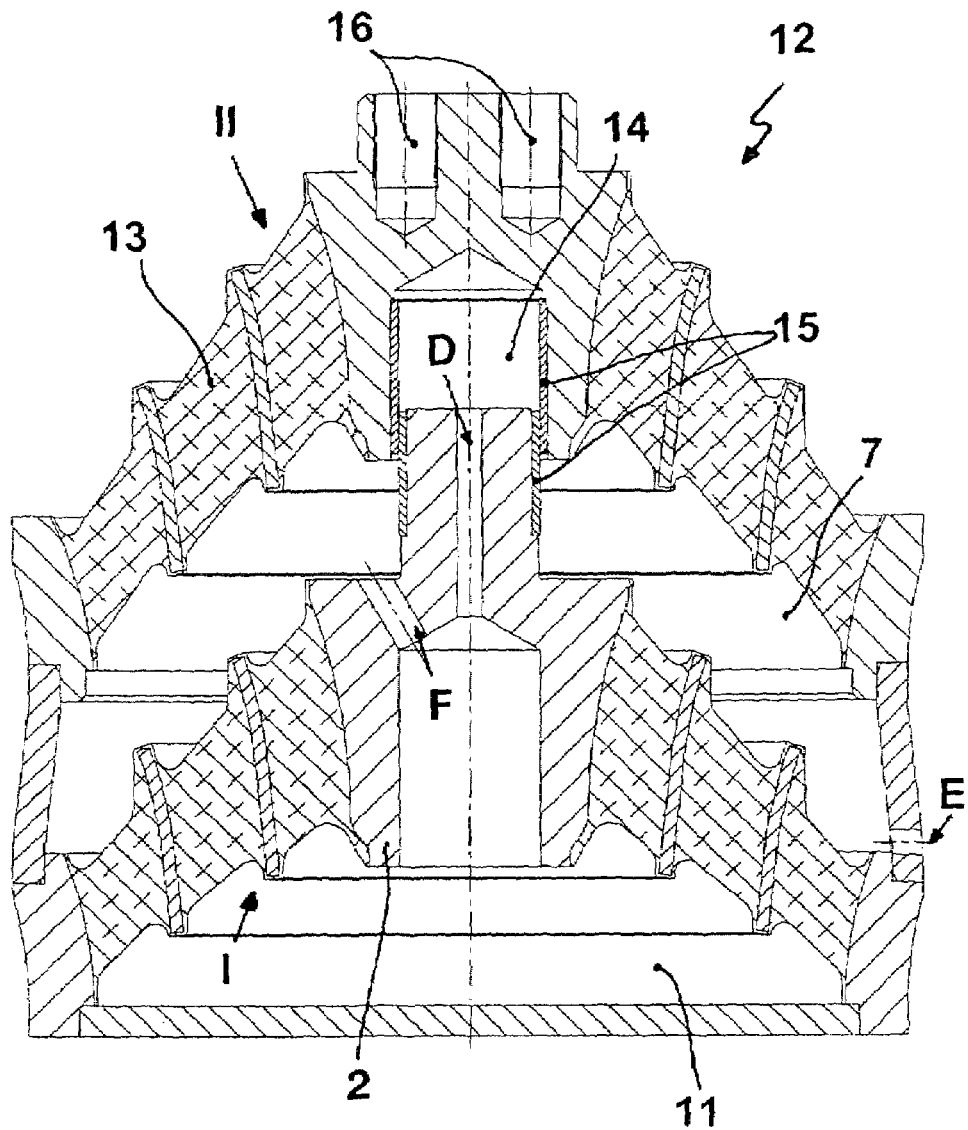

The invention will now be explained using exemplary embodiments, making reference to the drawings. These show:

FIG. 1 a two-stage elastomer spring having a cushion of elastomer material as well as a system of equalization bores;

FIG. 2 a two-stage elastomer spring having a cushion in the form of a layered spring as well as a system of equalization bores.

The elastomer spring 1 according to FIG. 1 consists, in the vertical direction, of a first spring I and a second spring II, each of which comprises a core 2, an outer sleeve 3, and a cushion 3 made of elastomer material. The cushion generally possesses a slanted shoulder design. In this connection, the core and the outer sleeve have cone surfaces 5 and 6, respectively, which correspond with the cushion and adhere to it. Each spring is joined together as a single component, specifically by means of a plug-in groove system 8 and 9, respectively, of the core components and the outer sleeve components. When the core components are joined together, an equalization bore A assures ventilation.

A chamber 7 is present between the two springs I and II, at a distance L of the vertical clearances of 15 to 45 mm, which chamber extends continuously from the core to the outer sleeve. In addition, the elastomer spring is provided with a base chamber 11, which is formed below a core offset H with reference to the outer sleeve bottom, and has a sealing plate 10 at its bottom.

In the following, two chamber variants will now be presented:

The chamber 7 and the base chamber 11 are configured as air chambers, whereby the two equalization bores B and C ensure that the individual air volumes can balance out. If necessary, the equalization bore B can be combined with a throttle that can be controlled or regulated.

The chamber 7 and the base chamber 11 are filled with a damping fluid, which is glycol, in particular. Here, the equalization bore B is combined with a throttle that can be controlled or regulated, while the equalization bore C has the function of an overflow channel between the chamber 7 and the base chamber 11, within the core 2 of the spring I.

FIG. 2 shows an elastomer spring 12, the cushion 13 of which is a layered spring in the form of a metal/elastomer laminate. The metal parts can also be replaced by a corresponding plastic, for example on the basis of polyphenylene ether.

The plug-in groove system 14 of the core components is provided with a glide system 15 here, for example in the form of glide bushings. The core 2 of the spring I has two equalization bores D and F. In this connection, the equalization bore D takes over venting of the groove of the plug-in groove system when the spring I and II are joined together in the case of a chamber 7 and a base chamber 11 filled with air. If the two chambers 7 and 11 as well as the groove of the plug-in groove system are filled with a damping fluid, the equalization bore D has the function of an overflow channel.

The same aspects as those already described within the framework of FIG. 1 apply with regard to the equalization bores E and F.

The core components and sleeve components as well as the layer components of the cushion 13 have concave or convex surfaces.

The core component of the spring II is usually provided with an attachment system 16.

The principle of a state of two stages as shown in FIGS. 1 and 2 can also be applied to a state of three stages or multiple stages, whereby the measures of claims 2 to 3 can be used. In most cases, however, an elastomer spring having two stages is sufficient with regard to the statement of task.

Even though the measure according to claim 2 is an advantageous configuration of the multi-stage elastomer spring, the sealing plate 10 can be eliminated, specifically with the formation of a base chamber 11 that is then open on the bottom, which does not communicate with the chamber 7. In this regard, reference is made to the document DE 295 20 881 U1 that was mentioned initially.

REFERENCE SYMBOL LIST 1 elastomer spring
2 core
3 outer sleeve
4 cushion
5 cone surfaces of the core
6 cone surfaces of the outer sleeve
7 chamber
8 plug-in groove system of the core
9 plug-in groove system of the outer sleeve
10 sealing plate
11 base chamber
12 elastomer spring
13 cushion (layered spring)
14 plug-in groove system of the core
15 glide system
16 attachment system
I first spring (bearing)
II second spring (bearing)
X vertical direction
L distance between the vertical clearances
A equalization bore
B equalization bore
C equalization bore
D equalization bore
E equalization bore
F equalization bore
H core offset

What is claimed is:

1. Elastomer spring (1, 12), comprising at least:
a core (2) made of metal or plastic;
an outer sleeve (3) that also consists of metal or plastic;
a cushion (4, 13) made of elastomer material, in the form of a layered spring that is arranged between the core (2) and the outer sleeve (3); as well as
a base chamber (11) that is configured below a core offset (H), wherein
the elastomer spring (1, 12) is configured in multiple steps in the vertical direction X, consisting of at least a first spring (I) and a second spring (II), whereby a chamber (7) is present between two springs, in each instance and wherein each spring (I, II) is joined together as individual components, and the chamber (7) between two springs extends continuoustly from the core (2) to the outer sleeve (3) and wherein individual components are joined together by means of a plug-in groove system (8, 9, 14) of core components and outer sleeve components.

2. Elastomer spring according to claim 1, wherein base chamber (11) is provided with a sealing plate (10) on the bottom, and wherein the base chamber communicates with the chamber (7) between two springs (I, II).

3. Elastomer spring according to claim 1, wherein the plug-in groove system (14) of the core components is provided with a glide system (15).

4. Elastomer spring according to claim 1, wherein a distance L between vertical clearances between the first and the second spring (I, II) is 15 to 45 mm.

5. Elastomer spring according to claim 1, wherein the chamber (7) between two springs (I, II) is provided with at least one equalization bore (A, B, C, D, E, F).

6. Elastomer spring according to claim 5, wherein the equalization bore (A, B, C, D, E, F) runs within the core (2) and/or the outer sleeve (3).

7. Elastomer spring according to claim 5 wherein the equalization bore (B, E) is combined with a throttle that can be controlled or regulated.

8. Elastomer spring according to claim 1, wherein the chamber (7) between two springs (I, II) is configured as an air chamber.

9. Elastomer spring according to claim 1, wherein the chamber (7) between two springs (I, II) is filled with a damping fluid.

10. Elastomer spring according to claim 9, wherein the damping fluid is a multivalent alcohol, particularly glycol.

11. Elastomer spring according to claim 1, wherein the core (2) and/or the outer sleeve (3) have cone surfaces (5, 6), concave and/or convex surfaces, which correspond to the cushion (4, 13).

* * * * *